United States Patent

Care

(10) Patent No.: US 9,015,942 B2
(45) Date of Patent: Apr. 28, 2015

(54) METHOD OF TREATING AN AEROFOIL

(75) Inventor: Ian C. D. Care, Derby (GB)

(73) Assignee: ROLLS-ROYCE plc, London (GB)

(*) Notice: Subject to any disclaimer, the term of this patent is extended or adjusted under 35 U.S.C. 154(b) by 541 days.

(21) Appl. No.: 13/536,101

(22) Filed: Jun. 28, 2012

(65) Prior Publication Data

US 2013/0026147 A1 Jan. 31, 2013

(30) Foreign Application Priority Data

Jul. 25, 2011 (GB) .................................... 1112696.8

(51) Int. Cl.
*G01M 7/08* (2006.01)
*G01M 5/00* (2006.01)

(52) U.S. Cl.
CPC ............ *G01M 7/08* (2013.01); *Y10T 29/49336* (2015.01); *Y10T 29/47* (2015.01); *G01M 5/0016* (2013.01); *G01M 5/0033* (2013.01); *G01M 5/0075* (2013.01)

(58) Field of Classification Search
CPC ............ G01M 5/0016; G01M 5/0033; G01M 5/0041; G01M 5/0075; G01M 7/08; Y10T 29/49336; Y10T 29/47
See application file for complete search history.

(56) References Cited

U.S. PATENT DOCUMENTS

| | | | | |
|---|---|---|---|---|
| 5,439,354 A * | 8/1995 | Hansen et al. | ............... | 416/233 |
| 6,075,593 A * | 6/2000 | Trantow et al. | ............... | 356/318 |
| 6,923,877 B1 * | 8/2005 | Anderson | ............... | 148/525 |
| 7,137,282 B2 * | 11/2006 | Westley et al. | ............... | 72/53 |
| 2002/0017144 A1 | 2/2002 | Miles et al. | ............... | 73/808 |
| 2005/0145306 A1 * | 7/2005 | Statnikov | ............... | 148/508 |
| 2007/0157447 A1 * | 7/2007 | Prevey | ............... | 29/402.01 |
| 2014/0007394 A1 * | 1/2014 | Haas et al. | ............... | 29/90.01 |
| 2014/0330525 A1 * | 11/2014 | Nervi et al. | ............... | 702/34 |

FOREIGN PATENT DOCUMENTS

| EP | 1 191 112 A1 | 3/2002 |
|---|---|---|
| EP | 1 662 092 A2 | 5/2006 |

OTHER PUBLICATIONS

Oct. 5, 2011 Search Report issued in British Patent Application No. GB1112696.8.

* cited by examiner

*Primary Examiner* — Alexander P Taousakis
(74) *Attorney, Agent, or Firm* — Oliff PLC

(57) ABSTRACT

A method of imparting deep compressive residual stress to an aerofoil, the method involves determining a stress map for the aerofoil for stress generated by Foreign Object (FOD) impact, a stress map for the aerofoil of high cycle fatigue, a stress map for the aerofoil of low cycle fatigue and determining a combined stress map by combining the stress map of FOD impact, the stress map of high cycle fatigue and the stress map of low cycle fatigue. A zone is then defined on the aerofoil from the combined stress map for receiving the deep residual compressive stress, and compressive residual stress imparted to the defined zone.

20 Claims, 5 Drawing Sheets

METHOD OF TREATING AN AEROFOIL

The present invention relates to a method of treating an aerofoil and particularly to a method of imparting compressive stress to an aerofoil.

It is an object of the invention to seek to provide an improved method of determining the locations where compressive stress should be applied to an aerofoil, for determining the level of compressive stress to be applied a the locations and a method of imparting the compressive stress to an aerofoil.

According to a first aspect of the invention there is provided a method of imparting deep compressive residual stress to an aerofoil, the method comprising the steps of: a) determining a stress map for the aerofoil for stress generated by Foreign Object (FOD) impact, b) determining a stress map for the aerofoil of high cycle fatigue (HCF), c) determining a stress map for the aerofoil of low cycle fatigue (LCF), d) determining a combined stress map by combining the stress map of FOD impact, the stress map of high cycle fatigue and the stress map of low cycle fatigue, e) defining a zone on the aerofoil from the combined stress map for receiving the deep residual compressive stress, and f) imparting compressive residual stress to the defined zone.

The step of determining a stress map for FOD impact may include the steps of determining the impact location of foreign objects on the aerofoil at a selected operating condition of the aerofoil and the stress imparted to the blade by the impact. Preferably the selected operating condition is at take-off.

The step of determining the stress map for the aerofoil of high cycle fatigue may include the steps of applying finite element analysis to the aerofoil for at least one major excitation mode of the aerofoil.

The step of determining the stress map for the aerofoil of high cycle fatigue includes the steps of applying finite element analysis to the aerofoil for a selected engine cyclic load.

Typically, the selected engine load is the acceleration to maximum take off velocity.

The step of determining the combined stress map for the aerofoil includes the steps of applying a goal seeking algorithm to calculate the maximum stress from the LCF deflection at a given velocity or acceleration summed with the HCF deflection and FOD impact stress.

Preferably the step of defining a zone on the aerofoil comprises the steps of providing a first zone for higher deep residual stress (DRS) which encompasses the stressed areas on the combined stress map which exceed the material limit of the aerofoil and a second zone for lower deep residual stress which encompasses the levels of combined stress that are at 95% or more of the material limit of the aerofoil and preferably at 90% or more of the material limit of the aerofoil Typically the majority of the combined stress within the first zone is provided by the determined high cycle fatigue (HCF) characteristics.

There may be multiple first zones separated by one or more second zones.

The step of defining a zone may include a third zone which blends between the higher deep residual stress zone and the lower deep residual stress zone.

Preferably a zone is defined for a pressure surface of an aerofoil and a zone is defined for a suction surface of an aerofoil and the effect of applying deep residual stress to the zones is determined, wherein when the effect inducing twist or distortion of the aerofoil outside a predetermined threshold adjusting the zone on either or both of the pressure or suction surfaces.

The adjustment is preferably selected from a group including varying the area of the zone, the spacing of the zone, and/or the depth of the zone.

The compressive residual stress may be imparted by peening.

Preferably the peening is selected from the group comprising: shot peening, High Intensity Shot Peening (HISP), laser shock peening, cavitation or water jet peening, ultrasonic peening, electro shock peening The compressive residual stress may be imparted by burnishing. The burnishing may be roller burnishing or deep cold rolling.

According to a second aspect of the invention there is provided a method of imparting deep compressive residual stress to an aerofoil, the method comprising the steps of a) providing a defined zone on an aerofoil for receiving the deep residual compressive stress from a combined stress map provided from a stress map for the aerofoil for stress of Foreign Object (FOD) impact, a stress map for the aerofoil of high cycle fatigue, and a stress map for the aerofoil of low cycle fatigue, and b) imparting compressive residual stress to the defined zone.

The invention will now be described by way of example only and with reference to the accompanying drawings in which.

Figure 1:
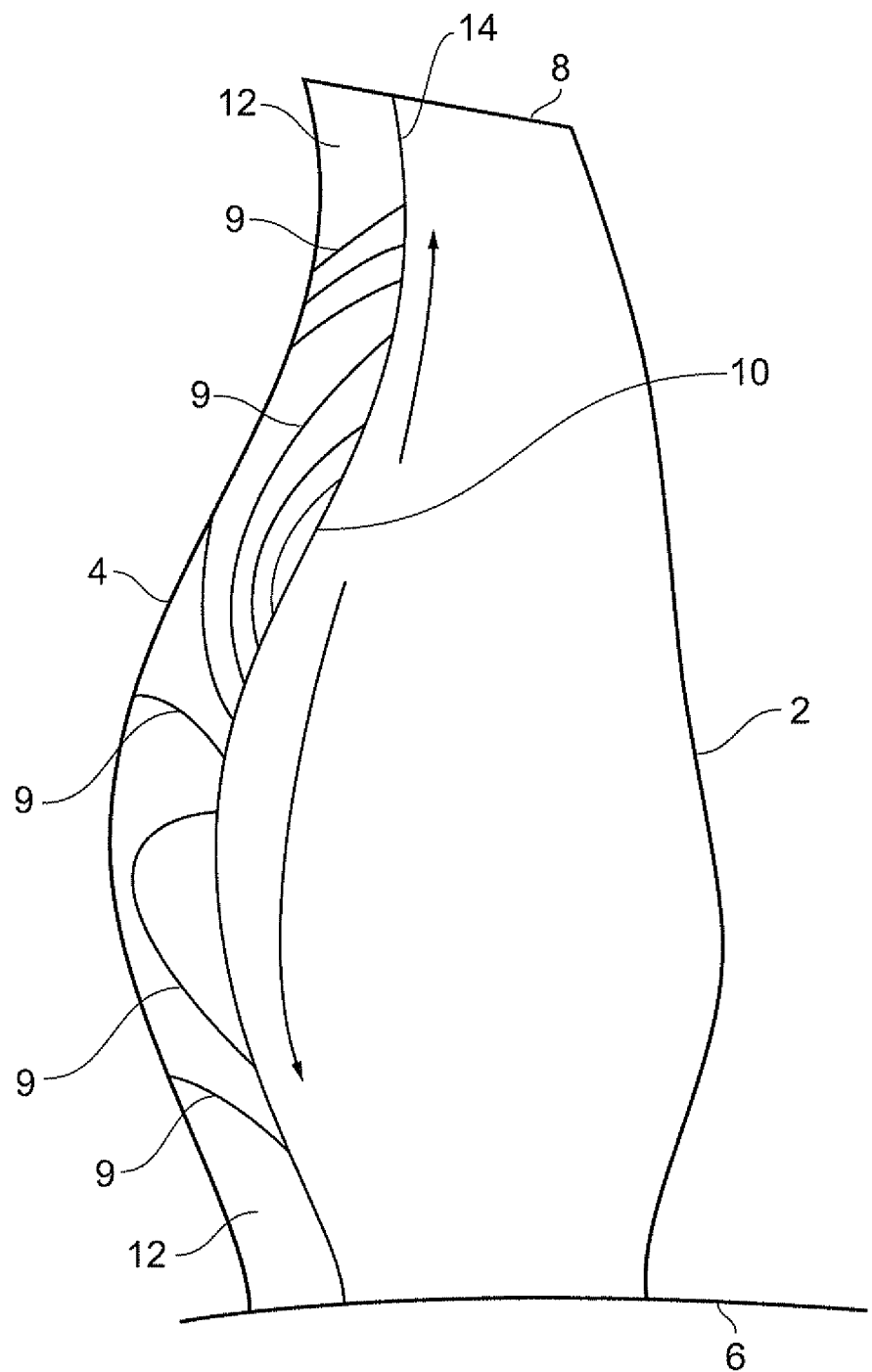
FIG. 1 depicts an aerofoil having a mapped Foreign Object (FOD) impact stress map.

FIG. 1 depicts a typical fan blade for a gas turbine engine. The aerofoil has a leading edge 4, a trailing edge 2, a radially inner end 6 mounted to a hub and a radially outer tip 8. The blade in use is subject to impact by small foreign objects which can cause damage to the areas of the blade on which they impact. The majority of the foreign object damage occurs during takeoff or landing because it is at these times that the engine is operating close to the ground with the blade rotating at close to, and preferably within 15% of the maximum operating rotational velocity, and some types of thrust reverser can disturb dust and debris on the ground such that it is thrown up for ingestion by the aircraft engine. The engine can cause air flow fields which disrupt dust and other particles which are ingested into the engine and impact the blades causing damage.

The FOD impact can be measured or modelled at these conditions to determine the probability of an impact at a given location and the likely impact energy for a given foreign object. The impact location for each foreign object can be modelled for a range of typical object sizes, blade spacing, axial velocity of the object towards the fan, rotational velocity of the fan, the duct flow conditions. The impact energy for each object can also be modelled and associated with the impact location to provide an impact map which is shown schematically by the contour lines 9 on FIG. 1 which, in this embodiment, shows that there is a region of high impact energy 10 near the leading edge and about two thirds of the way up the blade and regions of low impact energy 12 near the leading edge towards the tip and the hub and degrees of impact energy therebetween. Beyond a distance from the leading edge and denoted by line 14 there is minimal impact energy as the rotational movement of a preceeding blade in the array shields this portion of the subsequent blade.

Compressive stress may be imparted into the aerofoil to harden the surface and reduce the risk of crack formation. Typical techniques that may be used to impart the compressive stress are peening or burnishing. Peening covers a multitude of sub techniques that are used to generate the shockwave that is required to impart the compressive stress to the article. For example the peening may be laser shock peening in which a laser is directed towards the surface; electro-spark peening in which an electric spark generates the necessary shock-wave; shot peening where particles are directed to the surface. Laser shock peening and electro-spark peening are able to provide compressive stress to a depth greater than that possible by shot peening alone. A further method for providing compressive stress is burnishing where a ball, supported in a hydrostatic bearing, is traversed across the surface of the component.

Peening will mitigate against failure of an aerofoil due to FOD by inducing a through-wall compressive stress field in the leading edge region of the aerofoil. Equilibrium must be maintained, so balancing tensile residual stresses must be present remote from the leading edge. However, careful control of application parameters allows these stresses to be placed in a less susceptible region of the aerofoil.

Gas turbine engine fan blades are also subjected to a combination of low cycle fatigue and high cycle fatigue stresses in operation of the gas turbine engine. These low cycle fatigue and high cycle fatigue stresses have a detrimental effect on the integrity of the fan blades, compressor blades and turbine blades. The low cycle fatigue (LCF) is a result of the centrifugal force experienced by the fan blades as they rotate about the axis of the gas turbine engine. The high cycle fatigue (HCF) is a result of aerodynamic and other vibration excitation of the fan blades. The centrifugal force on a fan blade may exert a mean stress of the order of 500 MPa, or more, resulting in low cycle fatigue. The high cycle fatigue fundamental mode frequencies are around 50 Hz for a large engine fan blade. It will be appreciated that the fundamental frequencies for each component will be different. Low cycle fatigue is also caused by crosswinds on the fan which causes flexure of the blades and twist. The high and low cycle fatigue may be determined by subjecting a test component to repeated vibrations in equipment such as that known in US20020017144 incorporated herein by reference.

Figure 2:
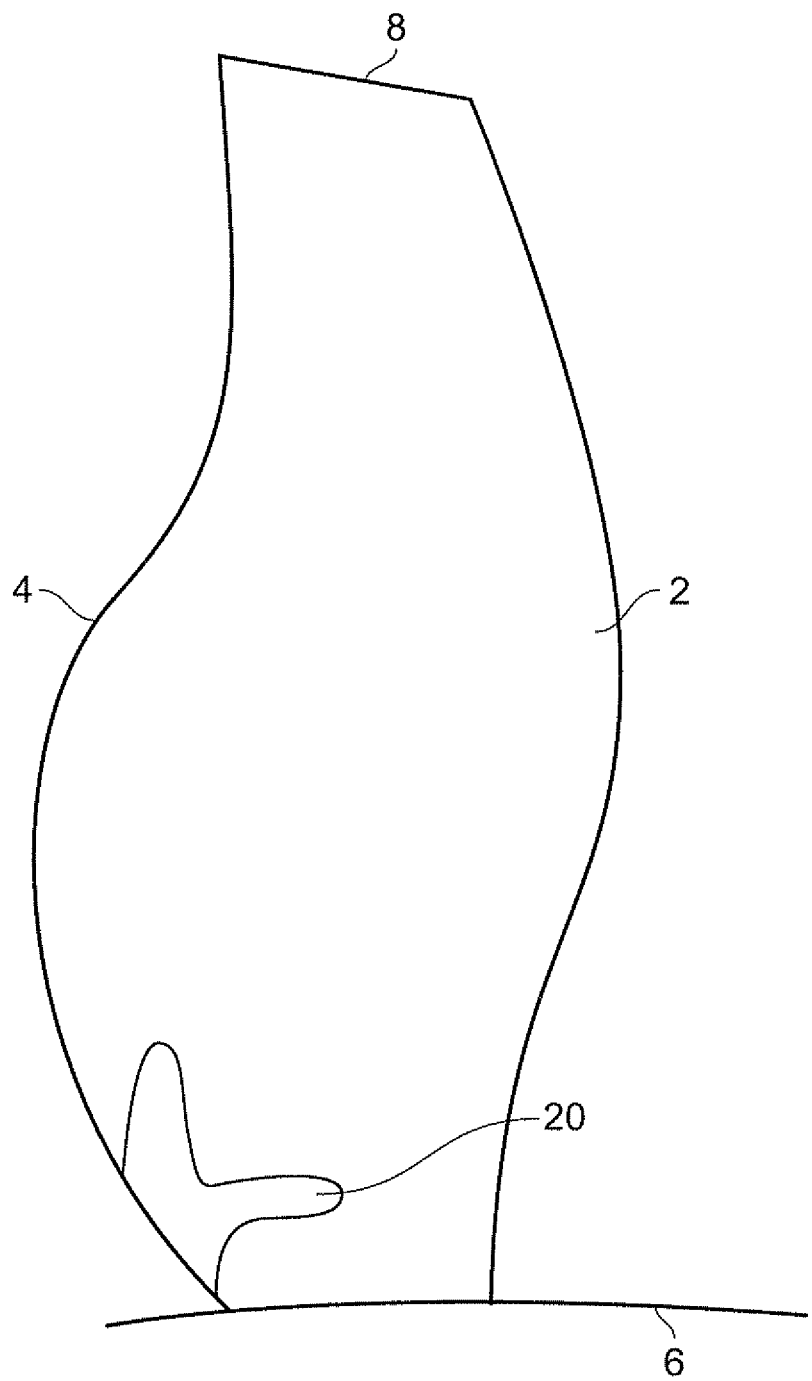
FIG. 2 depicts an aerofoil having a high cycle fatigue (HCF) stress map.

A typical high cycle fatigue pattern for a pressure surface of the fan blade of FIG. 1 is depicted in FIG. 2 and is calculated using an FE analysis (such as commercially available as LSDyna or SC03) at a major excitation modes of the aerofoil. The contour 20 is the region of the aerofoil in which the stress levels exceed the safe operating material limit of the aerofoil. The safe operating material limit is selected from the material properties and a safety factor or reserve based on experience and history of worn parts. Thus this limit is less than the absolute bulk material properties for material failure. Further contours (not show) extend around the contour 20 and which define areas of stress caused by high cycle fatigue but the stress will not exceed the material limit of the aerofoil. The safe operating material limit of the aerofoil can be extended by imparting residual compressive stress using one of the techniques described above. A region in which the stress levels exceed the material limit of the aerofoil may also be found on the suction surface of the blade. The region will be of similar form to that of the pressure surface but it is likely to be of a slightly different shape and/or size.

Figure 3:
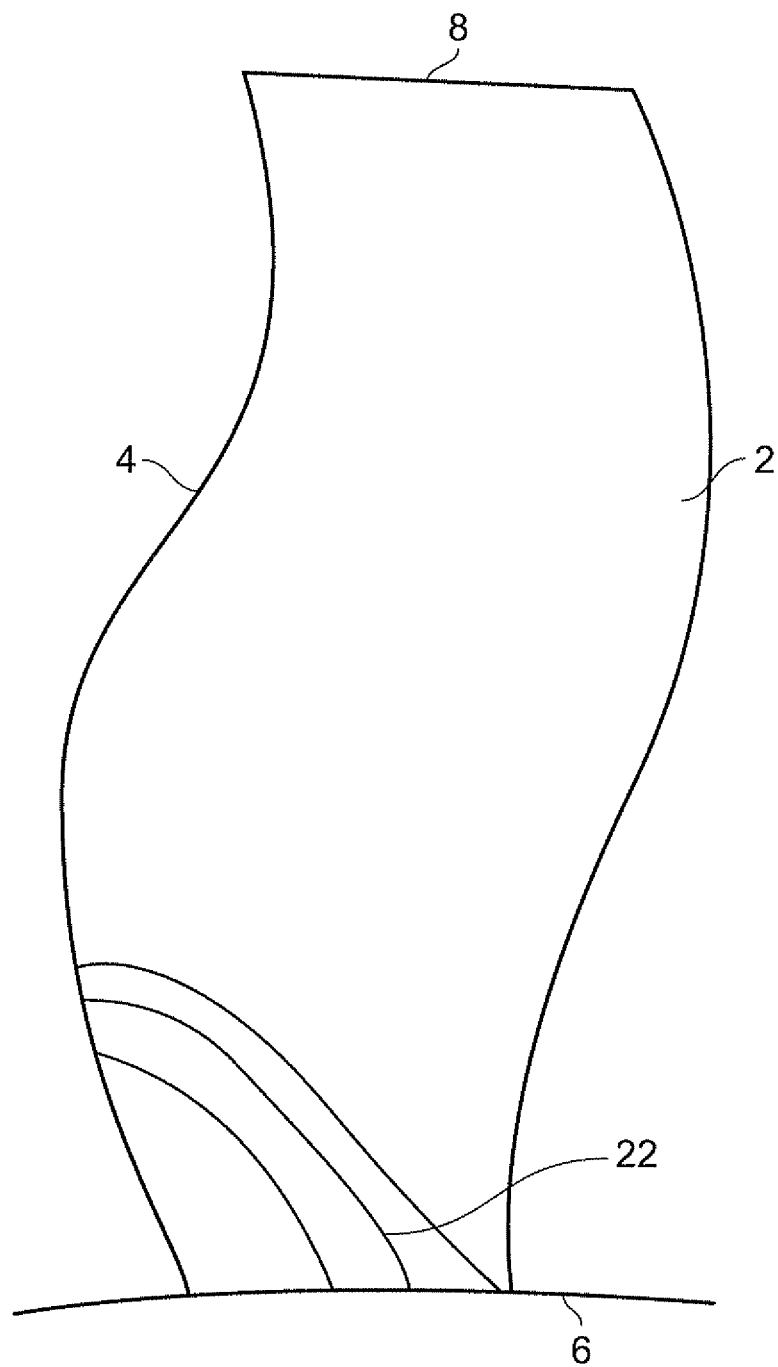
FIG. 3 depicts an aerofoil having a low cycle fatigue (LCF) stress map.

A typical low cycle fatigue pattern for a pressure surface of the fan blade of FIG. 1 is depicted in FIG. 3. The contour 22 is the region of the aerofoil in which the stress levels caused by the LCF is considered to be significant. The LCF stress level is considered significant if it reaches such a level that it would cause a crack or crack initiator to grow. It can also be regarded as significant if it occurs in a region when combined with another stress raising feature such as FOD impact or blade flutter that it would take the stress levels for that region to the safe material operating limit. A region in which the stress levels caused by the LCF is considered to be significant may also be found on the suction surface of the blade. The region will be of similar form to that of the pressure surface but it is likely to be of a slightly different shape and/or size.

Figure 4:
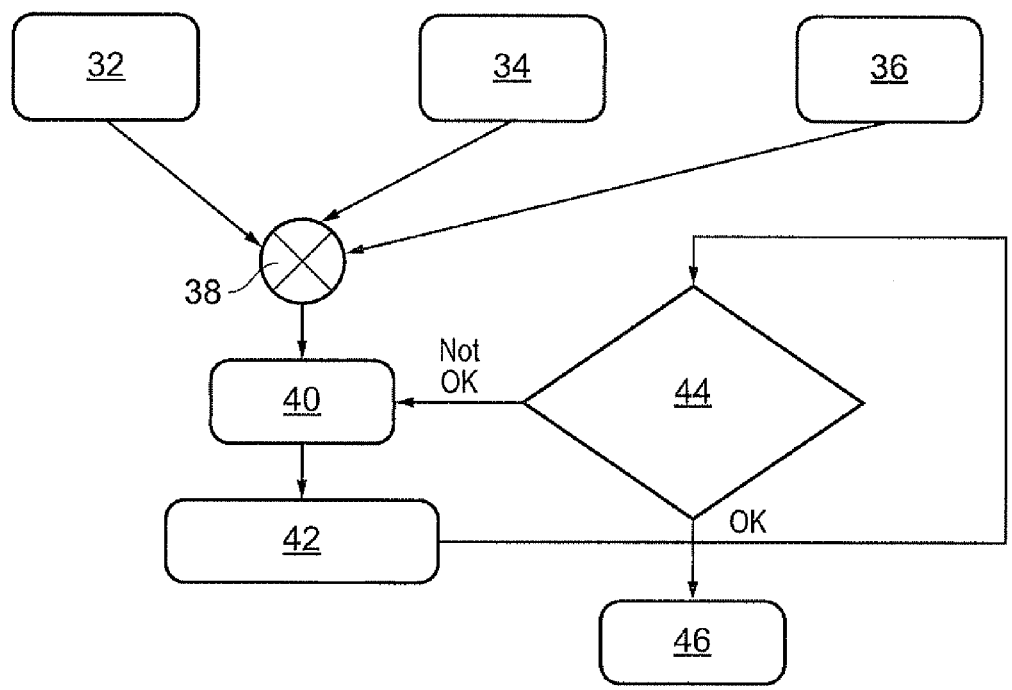
FIG. 4 depicts a flow chart of the process steps to determine the zones to which compressive stress should be applied.

To calculate the zones to which compressive stress is to be applied a process according to FIG. 4 is applied where the stress patterns for the aerofoil of FOD 32, LCF 34 and HCF 36 are summed in a summation device 38 to provide an overall stress pattern.

The overall stress pattern is calculated using a goal seeking algorithm to combine LCF deflection with HCF deflection at a given velocity. The deflections are equated to a surface stress map to which is added any foreign object impact stress calculated at that given velocity. Thus the overall stress pattern is not the sum of the maximum LCF, maximum impact stress and maximum HCF as not all the maximums occur at the same time or place.

The overall stress pattern is fed into zoning module 40 which calculates the location and size of a first zone to which a high level of compressive stress will be applied. The high level of compressive stress is applied to those areas of the aerofoil for which the combined stress pattern indicate that the operating material limit is exceeded, the compressive stress, when applied, serving to increase the material limit above the combined stress levels. The outer boundary of the first zone is smoothed using, for example a least squares plus one algorithm or other suitable function so that there are no sharp changes in any direction around the periphery of the zone. The first zone therefore includes some areas of the blade where the combined stress pattern amounts to less than the material limit.

If the applied compressive stress pattern to the first zone cannot bring the combined stress levels below the safe operating material limit then component redesign or material reselection may have to be made.

The zoning module also calculates the location and size of a second zone to which a lower level of compressive stress is to be applied. The zone is calculated to encompass those areas that are within a defined percentage of the operation material limit, such as 5%. In close controlled applications such as continuous running gas turbines on pipeline pumping stations this may be 1 or 2%. The size of this area is also determined from the probabilistic calculations relating to the determined stress levels. For example, if the stress calculations have a 97% probability of lying within the calculated area, the remaining 3% lie outside the calculated area to which a safety factor can also be applied. Thus, the zone is extended to encompass these factors to give a safety margin on the calculations. The outer boundary of the second zone is smoothed, typically in a similar way to the first zone so that there are no sharp changes in any direction around the periphery of the zone. The level of compressive stress at the outer boundary may be calculated to provide a smooth transition to the area of the aerofoil for which no compressive stress need be applied.

The zoning mode may also calculate the location and size of a third zone between the first and second zone within which the level of compressive stress is calculated to provide a smooth transition between the first zone and the second zone without large differences in the level of residual stress to be applied.

The zoning module calculates first, second and optionally third zones for both the suction surface and the pressure surfaces of the aerofoil and defines the minimum compressive stress level required for each zone.

The detail of each of the pressure surface zone and the suction surface zone is sent to a smoother 42 which also considers the difference between each side and the effect on the aerofoil by applying the deep compressive stress. The effect of the compressive stress is calculated, where it is applied by laser shock peening by applying an estimated shock profile to an area representing (for instance) each laser pulse on a finite element model. The shock profile is represented as a time varying external pressure. A constant pressure is assumed over the area of the pulse. For a laser pulse, the total application time modelled is typically around 30 nsecs which breaks down into 10 nsec rise, hold and decay times. In order to capture the behaviour of the shock wave, element sizes of the order of 10 μm are required and can be accommodated in two or three dimensions.

The material properties are estimated at the extremely high strain rates associated with the peening shock wave. Elastic and plastic material properties are derived based on experimental impact test data. The material model used is that known as the Johnson Cook Model, which has a strong empirical element in its formulation.

The smoother applies a feathering or taper algorithm, for example a rectangular or moving average, or an algorithm based on the Bezier model, from the zone edge towards the lower stress area. It also considers the aerofoil thickness and adjusts the calculations where the thickness of the blade allows the deep residual compressive stress applied to each side of the aerofoil to interact. The smoother thereby checks that the material is capable of achieving the modelled ideal properties. If this is not possible a design change may be required.

Once the value for each of the pressure surface zones and suction surface zones satisfies the smoother criteria a further check is made on the effect applying compressive stress to the aerofoil has when applied in accordance with the instructions sent from the smoother 42. In some circumstances when the compressive stress is applied the aerofoil can twist or distort leading to a sub-optimal aerodynamic performance or a resultant shape which is a deviant from that designed. Where the checking step 44 determines that the twist and/or distortion is unacceptable this drives either to change the differential areas (between suction and pressure surfaces) or to correct mechanically by changing the shape of the manufactured aerofoil. An iteration of the zoning in step 40 and the smoothing in step 42 is made to reduce the deviance from the as designed ideal shape, and to check that any revised manufactured shape and change in natural frequency does not require a further adjustment to the zoning calculations. Adjustments may be made to ensure the suction and pressure side patterns complement each other.

Geometrical distortion may occur with any treatment that introduces residual stresses into a component. Distortion may be seen both locally within the area, particularly in the thin sections e.g. thinning or elongation of the LE profile and/or it could occur as bulk aerofoil deformation. The distortion may not be fully exhibited until the aerofoil is under load conditions.

The distortion may be minimal in which case it may be deemed acceptable but some restoration of surface finish may still be required. In other cases there is distortion that requires additional machining to restore the defined profile. One option to mitigate this effect may require leaving additional material on the aerofoil prior to application of the residual stress.

In extreme cases the application of compressive stress causes systematic aerofoil distortion which requires alterations to the pre-welded blade shape. This option means that the application of residual stress has to be designed into the aerofoil manufacturing cycle at a very early stage allowing compensation to be made to the hot forming dies so that a blade profile is produced that then distorts into a desired shape after the application of the residual stress. This outcome is less desirable as it complicates the integration of the surface treatment into the aerofoil manufacturing process and delays the development of new aerofoils.

The effect the application of residual stress has on the aerofoil is determined in part by aerofoil geometry, the intensity of the residual stress and the area it covers with larger areas giving greater deformation.

Figure 5:
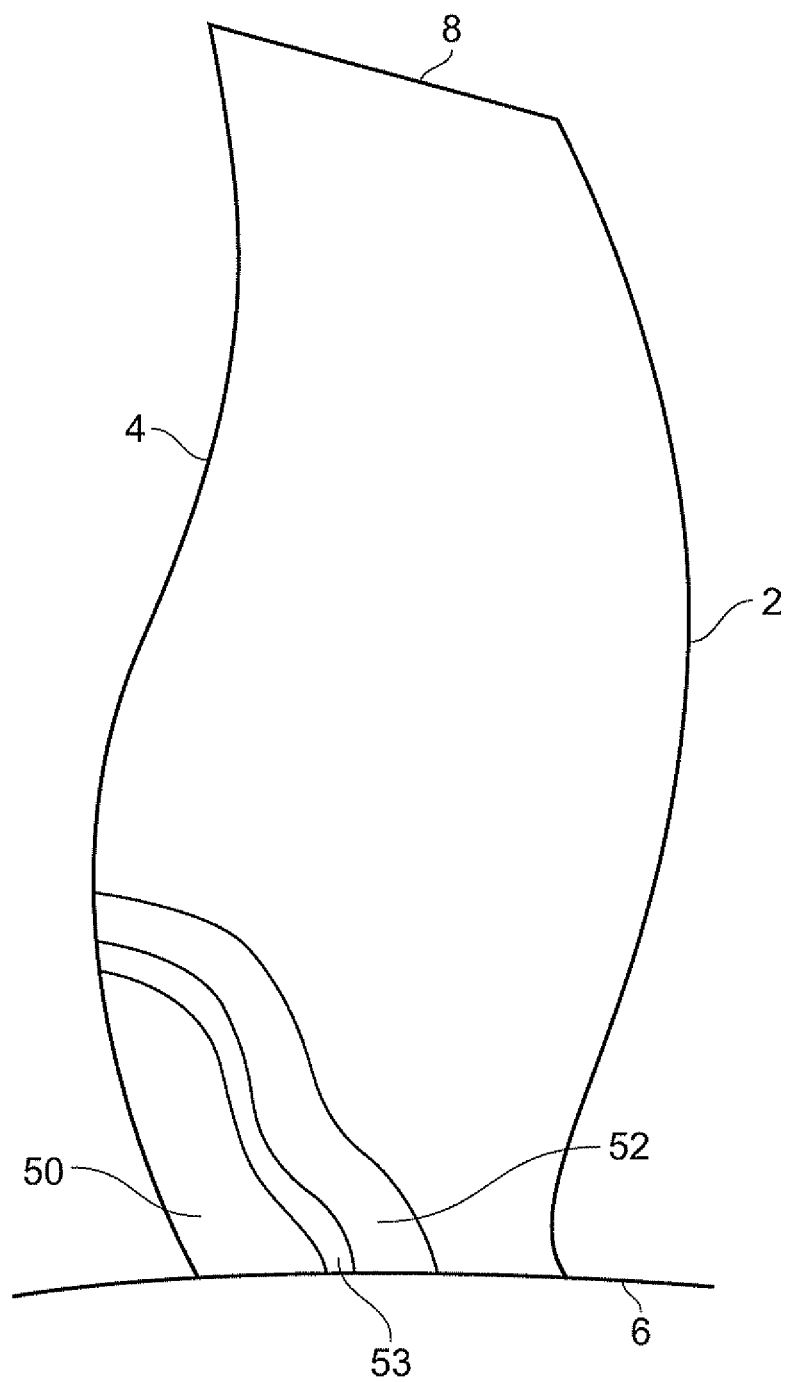
FIG. 5 depicts an aerofoil having exemplary zones to which compressive stress should be applied.

Once an acceptable compressive stress pattern is approved the values are passed to the apparatus which apply the compressive stress and the compressive stress is applied to the aerofoil in appropriate zones 50, 52 as shown in FIG. 5 where zone 50 receives high compressing stress and zone 52 receives lower compressive stress. A transitional zone 53 may be provided between the high zone 50 and the lower zone 52 to avoid a sharp change between the zones.

It will be appreciated that the invention offers a number of advantages. For example, the application of compressive stress is applied to optimised locations taking into account foreign object impact patterns, the natural frequency of component, the shape and changes caused by the induced stress, operational effects such as crosswind, and endurance (including high and low cyclic stressing).

The use of an impact map permits the compressive stress to be applied on a blade in the area where FOD may impinge even though the area is not symmetric taking into account impact trajectory, intensity, and impact object size based on aerodynamic properties, the natural frequency, aerodynamic forcing, impact forcing, material properties and shape, including internal structure and is vibration, endurance, flight envelope and crosswind.

Beneficially compressive stress is applied in an efficient manner to the areas that require it. The cost and time for manufacture is thereby reduced and it is possible to control the compressive stress process such that the resultant pattern does not produce steps in stress nor pockets or patches that may cause unwanted distortion. Similarly the area and intensity of the applied residual stress is minimised which reduces unwanted distortions on the aerofoil.

This invention can be applied to blades with very different duties whereby the dominant stresses may vary between the blades and yet it will produce an effective and efficient result.

it will be appreciated that this method can equally be applied to static aerofoils as well as rotating ones.

It will be appreciated that for some applications there may be multiple first zones requiring a higher level of compressive stress. These multiple first zones may be separated by one of more second zones which may be continuous between the multiple first zones or may be discrete zones separated by regions to which no compressive stress is applied.

The zoning module may determine that no compressive stress needs to be applied for the input design and may additionally indicate if some articles have structures which lie beyond what can be achieved by the application of compressive stress and thereby indicate that a redesign of the article is required.

The invention claimed is:

1. A method of imparting deep compressive residual stress to an aerofoil, the method comprising the steps of:
   a) determining a stress map for the aerofoil for stress generated by Foreign Object (FOD) impact,
   b) determining a stress map for the aerofoil of high cycle fatigue,
   c) determining a stress map for the aerofoil of low cycle fatigue,
   d) determining a combined stress map by combining the stress map of FOD impact, the stress map of high cycle fatigue and the stress map of low cycle fatigue,
   e) defining a zone on the aerofoil from the combined stress map for receiving the deep residual compressive stress, and
   f) imparting compressive residual stress to the defined zone.

2. A method according to claim 1, wherein the step of determining a stress map for FOD impact includes the steps of determining the impact location of foreign objects on the aerofoil at a selected operating condition of the aerofoil and the stress imparted to the blade by the impact.

3. A method according to claim 2, wherein the selected operating condition is at takeoff.

4. A method according to claim 1, wherein the step of determining the stress map for the aerofoil of high cycle fatigue includes the steps of applying finite element analysis to the aerofoil for at least one major excitation mode of the aerofoil.

5. A method according to claim 1, wherein the step of determining the stress map for the aerofoil of high cycle fatigue includes the steps of applying finite element analysis to the aerofoil for a selected engine cyclic load.

6. A method according to claim 5, wherein the selected engine load is the acceleration to maximum take off speed.

7. A method according to claim 1, wherein the step of determining the combined stress map for the aerofoil includes the steps of applying a goal seeking algorithm to calculate the maximum stress from the LCF deflection at a given velocity or acceleration summed with the HCF deflection and FOD impact stress.

8. A method according to claim 1, wherein the step of defining a zone on the aerofoil comprises the steps of providing a first zone for higher deep residual stress (DRS) which encompasses the stressed areas on the combined stress map which exceed the material limit of the aerofoil and a second zone for lower deep residual stress which encompasses the levels of combined stress that are at 90% or more of the material limit of the aerofoil.

9. A method according to claim 8, wherein the step of defining a zone includes a third zone which blends between the higher deep residual stress zone and the lower deep residual stress zone.

10. A method according to claim 8 wherein a zone is defined for a pressure surface of an aerofoil and a zone is defined for a suction surface of an aerofoil and determining the effect of applying deep residual stress to the zones, wherein when the effect inducing twist or distortion of the aerofoil outside a predetermined threshold adjusting the zone on either or both of the pressure or suction surfaces.

11. A method according to claim 10, wherein the adjustment is selected from a group including varying the area of the zone, the spacing of the zone, and/or the depth of the zome.

12. A method according to claim 1, wherein the compressive residual stress is imparted by peening.

13. A method according to claim 12, wherein the peening is shot peening or High Intensity Shot Peening (HISP).

14. A method according to claim 12, wherein the peening is laser shock Peening.

15. A method according to claim 12, wherein the peening is cavitation or water jet peening.

16. A method according to claim 12, wherein the peening is ultrasonic peening.

17. A method according to claim 12, wherein the peening is electro shock Peening.

18. A method according to claim 12, wherein the compressive residual stress is imparted by burnishing.

19. A method according to claim 12, wherein the compressive residual stress is imparted by roller burnishing or deep cold rolling.

20. A method of imparting deep compressive residual stress to an aerofoil, the method comprising the steps of
   a) providing a defined zone on an aerofoil for receiving the deep residual compressive stress from a combined stress map provided from a stress map for the aerofoil for stress of Foreign Object (FOD) impact, a stress map for the aerofoil of high cycle fatigue, and a stress map for the aerofoil of low cycle fatigue, and
   b) imparting compressive residual stress to the defined zone.

* * * * *